A. Rankin,
Water Closet.
Nº 65,505. Patented June 4, 1867.
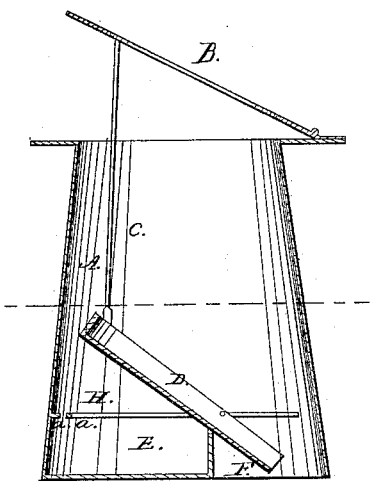
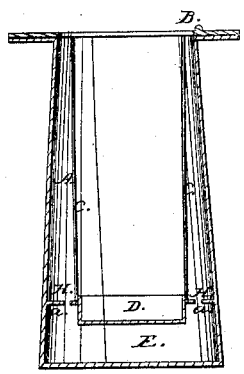
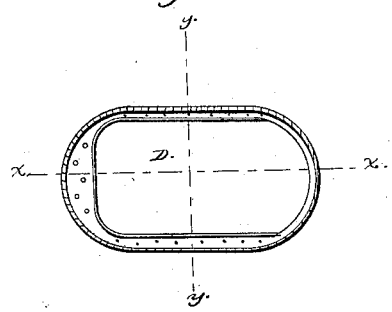
Witnesses:
Theo Fusche
Wm Trewin
Inventor:
A Rankin
Per Munn & Co.
Attorneys

United States Patent Office.

ANDREW RANKIN, OF NEW YORK, N. Y.

Letters Patent No. 65,505, dated June 4, 1867.

---

IMPROVEMENT IN WATER-CLOSETS.

---

*The Schedule referred to in these Letters Patent and making part of the same.*

---

TO ALL WHOM IT MAY CONCERN:

Be it known that I, ANDREW RANKIN, of the city, county, and State of New York, have invented a new and improved "Combined Water-Closet and Urinal Bowl;" and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim, and desire to secure by Letters Patent.

The present invention consists in hinging within the body of a water-closet bowl, and at or near its lower end, a pan or dish, which, by means of a rod or rods, is connected with a lid hinged to the top of the bowl, or to a handle, in such a manner that by the raising of the said lid or handle the pan will be overturned or upset so as to discharge its contents.

The pan is arranged within the bowl so as to embed itself in a receptacle suitably formed therein to receive and hold any deodorizing material, whether in the form of a liquid or powder suitable for deodorizing or disinfecting the excrement, urine, &c., discharged into the bowl. In the accompanying plate of drawings my improved combined water-closet and urinal bowl is illustrated—

Figure 1 being a plan or top view of the bowl.

Figure 2, a central vertical section, taken in the plane of the line $x\ x$, fig. 1; and Figure 3, a central transverse vertical section, taken in the plane of the line $y\ y$, fig. 1.

A, in the drawings, represents the bowl made of an oval or any other suitable shape in cross-section, and with a taper from end to end, it being placed in position with its smaller end uppermost. The upper end of the bowl is open, and to it is hinged one end of a lid, B, that in its centre is cut out corresponding to the open end of the bowl. C, a rod or rods hung to under side of lid B, from which, extending downward through the bowl, is hung at the lower end to a pan or dish, D, hinged to the inside of the bowl at or near its lower end, but with a reservoir or receptacle, E, under the same for a portion of its length; this pan being hung so that by the raising and lowering of the lid B it will swing within the bowl, it lying across the same when the lid is down, but when the lid is raised being inclined or tipped up from end to end, suitable for throwing its contents down through the opening F in the bowl at one end of its receptacle E. But the above may be changed so that the receptacle E will cover the whole bottom of the bowl A, the discharge pipe in this case being attached to an opening in the rear part of the bowl A. The pan or dish D is intended to set or project down into the receptacle E, and around such pan the reservoir is closed or covered by a plate, H, that is provided with a series of perforations, $a$, to allow the liquid contained in the receptacle to be forced from the same and into the pan, as such pan sinks into the receptacle. In the receptacle E the deodorizing material is to be placed, and by the arrangement of the pan within the bowl, as has been above described, such deodorizing agent will always cause the excrement, urine, &c., to be disinfected to a greater or less degree even if allowed by carelessness to remain in the pan. If desired, a water-discharge pipe for cleaning the pan or dish and washing off its contents may be arranged within the bowl, and in such a position as to act upon the pan when tipped up for being emptied.

I do not intend to confine myself to any one particular method of overturning the pan or dish D, as it admits of many variations, but I prefer the mode herein described, as it is simple, and not liable to get out of repair.

Having thus described my invention, I claim as new, and desire to secure by Letters Patent—

The pan or dish D and perforated receptacle E, in combination with a water-closet bowl, all arranged and operating substantially as and for the purpose described.

ANDREW RANKIN.

Witnesses:
  WM. F. MCNAMARA,
  J. A. SERVICE.